US010934008B2

(12) United States Patent
Vondrell et al.

(10) Patent No.: US 10,934,008 B2
(45) Date of Patent: Mar. 2, 2021

(54) DUAL FUNCTION AIRCRAFT

(71) Applicant: General Electric Company, Schenectady, NY (US)

(72) Inventors: Randy M. Vondrell, Cincinnati, OH (US); Glenn David Crabtree, Oregonia, OH (US); Dominic Barone, Centerville, OH (US)

(73) Assignee: General Electric Company, Schenectady, NY (US)

( * ) Notice: Subject to any disclaimer, the term of this patent is extended or adjusted under 35 U.S.C. 154(b) by 956 days.

(21) Appl. No.: 15/429,934

(22) Filed: Feb. 10, 2017

(65) Prior Publication Data

US 2018/0229606 A1 Aug. 16, 2018

(51) Int. Cl.
| | |
|---|---|
| *B64D 27/24* | (2006.01) |
| *B64C 29/00* | (2006.01) |
| *B60L 50/10* | (2019.01) |
| *B60L 1/00* | (2006.01) |
| *B64C 39/02* | (2006.01) |
| *B64D 27/14* | (2006.01) |
| *H02P 9/04* | (2006.01) |
| *B64D 27/02* | (2006.01) |

(52) U.S. Cl.
CPC ............. *B64D 27/24* (2013.01); *B60L 1/006* (2013.01); *B60L 50/10* (2019.02); *B64C 29/0033* (2013.01); *B64C 39/024* (2013.01); *B64D 27/14* (2013.01); *H02P 9/04* (2013.01); *B60L 2200/10* (2013.01); *B64C 2201/126* (2013.01); *B64C 2201/128* (2013.01); *B64D 2027/026* (2013.01)

(58) Field of Classification Search
CPC .. B64D 2027/026; B64D 27/02; B64D 27/10; B64D 27/24; B64D 35/02; Y02T 50/64; B64C 39/024; B64C 2201/042; B60L 2200/10; B60L 1/006
See application file for complete search history.

(56) References Cited

U.S. PATENT DOCUMENTS

| | | | |
|---|---|---|---|
| 8,727,271 B2 * | 5/2014 | Salyer | B64C 27/04 244/17.11 |
| 8,870,114 B2 | 10/2014 | Botti et al. | |
| 9,008,942 B2 | 4/2015 | Dyrla et al. | |
| 9,193,451 B2 | 11/2015 | Salyer | |
| 9,376,208 B1 | 6/2016 | Gentry | |

(Continued)

OTHER PUBLICATIONS

Extended European Search Report and Opinion issued in connection with corresponding EP Application No. 18155999.8 dated Apr. 10, 2018.

*Primary Examiner* — Zachary L Kuhfuss
(74) *Attorney, Agent, or Firm* — Dority & Manning, P.A.

(57) ABSTRACT

An aircraft includes an electric power source having a combustion engine and an electric generator. The electric generator is powered by the combustion engine. The aircraft also includes a propulsion assembly including a propulsor and an electric motor, the electric motor configured for rotating the propulsor. The aircraft also includes an electrical outlet configured for connection with an outside power sink. The electrical outlet and the propulsion assembly are selectively in electrical communication with the electric power source such that the electric power source selectively provides electrical power to one of the electrical outlet or the propulsion assembly.

20 Claims, 8 Drawing Sheets

(56) References Cited

U.S. PATENT DOCUMENTS

| | | |
|---|---|---|
| 9,561,860 B2 | 2/2017 | Knapp et al. |
| 2015/0143950 A1 | 5/2015 | Bedrine et al. |
| 2015/0285165 A1 | 10/2015 | Steinwandel et al. |
| 2016/0016670 A1 | 1/2016 | Sautreuil et al. |
| 2016/0137304 A1 | 5/2016 | Phan et al. |
| 2016/0236790 A1* | 8/2016 | Knapp .................. B64C 11/001 |
| 2016/0244158 A1 | 8/2016 | Fredericks et al. |
| 2016/0257416 A1* | 9/2016 | Himmelmann ......... B64D 27/02 |
| 2016/0375994 A1* | 12/2016 | Rossotto ................. B64C 27/12 |
| | | 701/3 |
| 2017/0066531 A1* | 3/2017 | McAdoo .............. H02K 7/1815 |
| 2018/0141671 A1* | 5/2018 | Anghel .................. B64D 27/24 |

* cited by examiner

DUAL FUNCTION AIRCRAFT

FIELD

The present subject matter relates generally to an aircraft including electrical power generation dual functionality.

BACKGROUND

Subsequent to disaster situations, for example, subsequent to a natural disaster such as a tsunami, hurricane, earthquake, tornado, etc., electrical power generation plants, and/or portions of an electrical grid, may be damaged. Accordingly, it may be difficult for areas affected by these disasters to receive electrical power during the time subsequent to such disaster.

In order to provide electric power to such locations, dedicated electric generators may be driven in to such locations. In the event the location is more remote, or that access roads to such location are damaged, aircraft may be used to fly in such dedicated electric generators. In the event that the affected location is too remote for a traditional, fixed wing aircraft to land, however it may be difficult to provide dedicated electric generators to such location. Accordingly, a system for providing electric power to a location, e.g., subsequent to a disaster, would be beneficial. More specifically, a system for providing electric power to a relatively remote location in need of electrical power would be especially useful.

BRIEF DESCRIPTION

Aspects and advantages of the invention will be set forth in part in the following description, or may be obvious from the description, or may be learned through practice of the invention.

In one embodiment of the present disclosure, an aircraft is provided. The aircraft includes an electric power source having a combustion engine and an electric generator. The electric generator is powered by the combustion engine. The aircraft also includes a propulsion assembly including a propulsor and an electric motor, the electric motor configured for rotating the propulsor. The aircraft also includes an electrical outlet configured for connection with an outside power sink. The electrical outlet and the propulsion assembly are selectively in electrical communication with the electric power source such that the electric power source selectively provides electrical power to one of the electrical outlet or the propulsion assembly.

In certain exemplary embodiments the electric power source is configured to generate a maximum output power, and wherein the aircraft is configured to provide substantially the maximum output power to the electrical outlet when the electric generator is in electrical communication with the electrical outlet.

In certain exemplary embodiments the combustion engine is a turboshaft engine.

In certain exemplary embodiments the electric power source is configured to generate at least about 1 megawatt.

In certain exemplary embodiments the aircraft further includes an electric power bus, wherein the electric power source is selectively in electrical communication with the propulsion assembly and the electrical outlet through the electric power bus. For example, in certain exemplary embodiments the electric power bus includes a switch for selectively electrically connecting the propulsion assembly and the electrical outlet to the electric power source.

In certain exemplary embodiments the aircraft is an unmanned aerial vehicle.

In certain exemplary embodiments the aircraft is configured for vertical takeoff and landing.

In certain exemplary embodiments the outside power sink is an electrical grid.

In certain exemplary embodiments the propulsion assembly further includes a plurality of propulsors and a respective plurality of electric motors.

In certain exemplary embodiments the propulsion assembly utilizes a maximum flight power during flight operations of the aircraft, the electric power source is configured to generate a maximum output power, and the maximum output power is greater than the maximum flight power. For example, in certain exemplary embodiments the maximum output power is at least about ten percent greater than the maximum flight power. For example, in certain exemplary embodiments the aircraft is configured to provide substantially the maximum output power to the outside power sink through the electrical outlet when the electric power source is in electrical communication with the electrical outlet.

In an exemplary aspect of the present disclosure, a method is provided for operating an aircraft. The aircraft includes an electric power source having a combustion engine and an electric generator powered by the combustion engine, a propulsion assembly, and an electrical outlet. The method includes operating the aircraft in a flight mode such that the aircraft provides electric power from the electric power source to the propulsion assembly and the propulsion assembly provides thrust for the aircraft. The method also includes operating the aircraft in a power generation mode such that the aircraft provides electric power from the electric power source to the electrical outlet.

In certain exemplary aspects operating the aircraft and the flight operating mode includes providing the propulsion assembly a first amount of power, wherein operating the aircraft in the power generation mode includes providing the electrical outlet a second amount of power, and wherein the first and second amounts of power are each at least about one megawatt.

In certain exemplary aspects the aircraft is grounded during the power generation operating mode.

In certain exemplary aspects operating the aircraft in the flight mode includes performing a vertical takeoff and/or landing.

In certain exemplary aspects operating the aircraft in the flight mode includes flying the aircraft to a destination and determining an amount of fuel required to fly the aircraft to the destination. With such an exemplary aspect, operating the aircraft in the power generation mode includes ceasing operating the aircraft in the power generation mode when a remaining amount of fuel is within a predetermined threshold of the determined amount of fuel required to fly to the destination.

In certain exemplary aspects operating the aircraft and the flight operating mode includes providing the propulsion assembly a first amount of power. With such an exemplary aspect operating the aircraft in the power generation mode includes providing the electrical outlet a second amount of power, wherein the second amount of power is greater than the first amount of power. For example, such an exemplary aspect the second amount of power may be at least about ten percent greater than the first amount of power.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
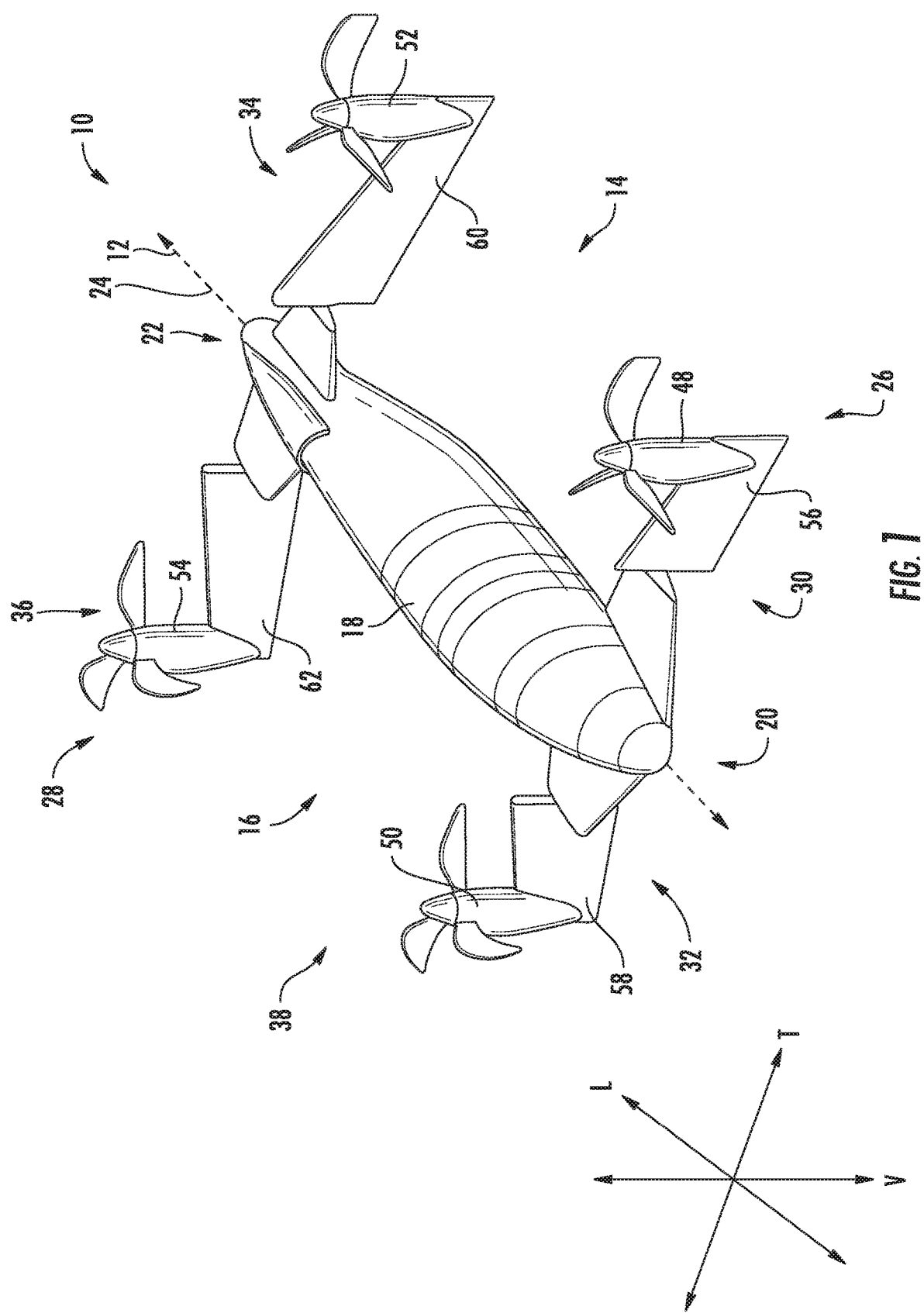
FIG. 1 is a perspective view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10% margin. Here and throughout the specification and claims, range limitations are combined and interchanged, such ranges are identified and include all the sub-ranges contained therein unless context or language indicates otherwise.

As used herein, the terms "processor" and "computer," and related terms, e.g., "processing device," "computing device," and "controller", are not limited to just those integrated circuits referred to in the art as a computer, but further broadly refers to one or more processing devices including one or more of a microcontroller, a microcomputer, a programmable logic controller (PLC), an application specific integrated circuit, and other programmable circuits, and these terms are used interchangeably herein. In the embodiments described herein, the computer or controller may additionally include memory. The memory may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, the computer or controller may include one or more input channels and/or one or more output channels. The input channels may be, but are not limited to, computer peripherals associated with an operator interface such as a mouse and a keyboard, or sensors, such as engine sensors associated with an engine, such as a gas turbine engine, for determining operating parameters of the engine. Furthermore, in the exemplary embodiment, the output channels may include, but are not be limited to, an operator interface monitor. Further, the memory may store software or other instructions, which when executed by the controller or processor allow the controller to perform certain operations or functions, such as one or more of the functions described in the method 200, below. The term "software" may include any computer program stored in memory, or accessible by the memory, for execution by, e.g., the controller, processor, clients, and servers.

Figure 2:
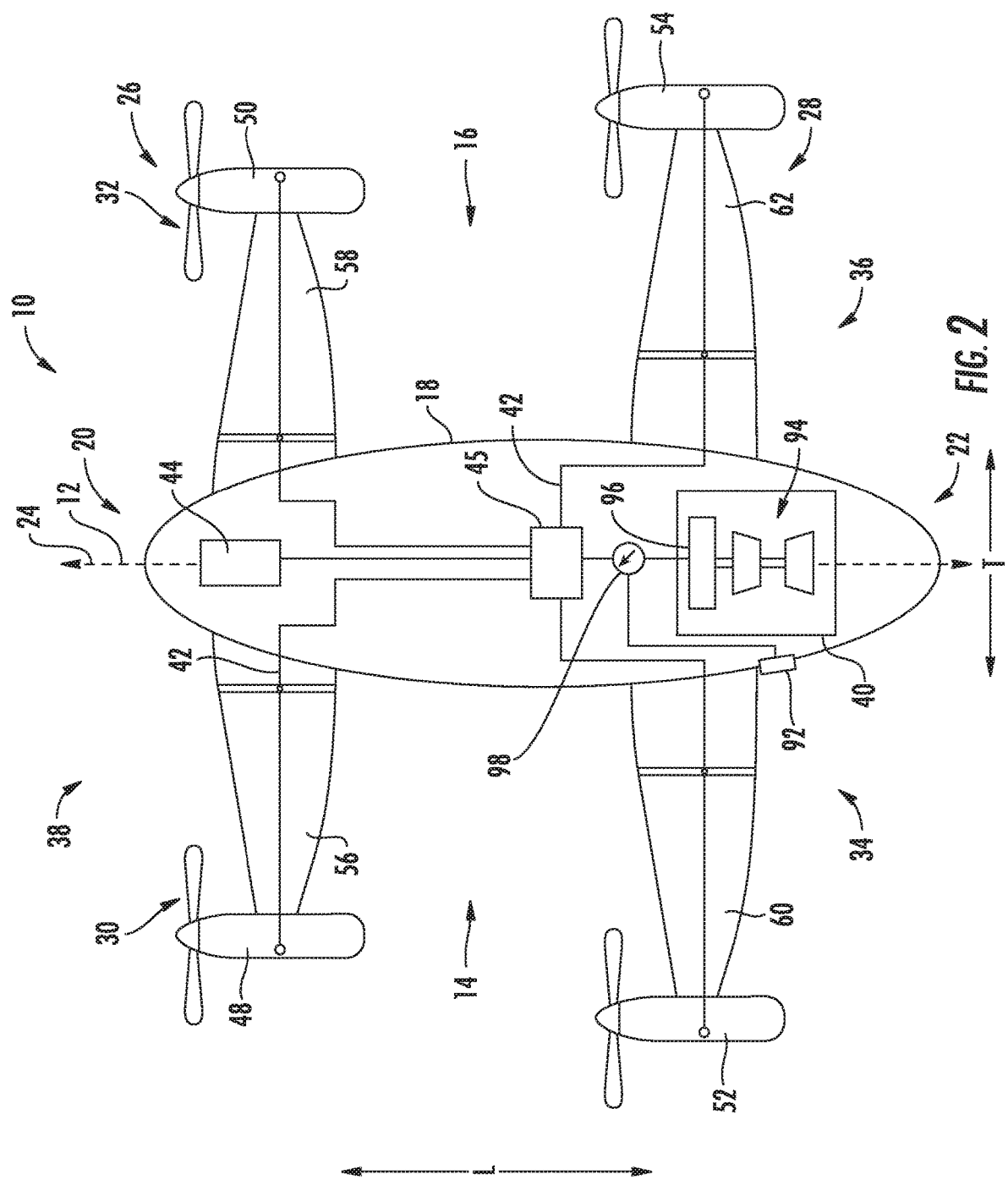
FIG. 2 is a top, schematic of the exemplary aircraft of FIG. 1.

Referring now to the drawings, wherein identical numerals indicate the same elements throughout the figures, FIG. 1 provides a perspective view of an exemplary aircraft 10 as may incorporate various embodiments of the present invention. FIG. 2 provides a top, schematic view of the exemplary aircraft 10 of FIG. 1. As shown in FIGS. 1 and 2 collectively, the aircraft 10 defines a longitudinal direction L (and a longitudinal centerline 12 that extends therethrough), a vertical direction V, and a transverse direction T. Additionally, the aircraft 10 defines a port side 14 and an opposite starboard side 16.

Notably, in certain exemplary embodiments, the exemplary aircraft 10 may be an unmanned aerial vehicle capable of flight without a human pilot aboard. For example, the exemplary aircraft 10 may be piloted by, e.g., remote control by human operator, or alternatively, may be fully or intermittently autonomous and controlled by onboard computers (not shown).

The aircraft 10 includes a fuselage 18 extending between a forward end 20 and an aft end 22 generally along the longitudinal centerline 12 of the aircraft 10. The aircraft 10 additionally includes a wing assembly attached to or formed integrally with the fuselage 18. Specifically for the embodiment depicted, the aircraft 10 includes a forward wing assembly 26 attached to or formed integrally with fuselage 18 proximate the forward end 20 of the fuselage 18 and an aft wing assembly 28 attached to or formed integrally with the fuselage 18 proximate the aft end 22 of the fuselage 18. Notably, for the embodiment depicted, the forward and aft wing assemblies 26, 28 are each configured as two separate wing sections or sides. Specifically, the forward wing assembly 26 includes a port side 30 and a starboard side 32 and the aft wing assembly 28 similarly includes a port side 34 and a starboard side 36. The port and starboard sides 30, 32 of the forward wing assembly 26 are each separately attached to the fuselage 18 approximately at the same location along the longitudinal centerline 12. Similarly, the port and starboard sides 34, 36 of the aft wing assembly 28 are also each separately attached to the fuselage 18 approximately at the same location along the longitudinal centerline 12. It should be appreciated, however, that in other embodiments, one or both of the forward wing assembly 26 or aft wing assembly 28 may be formed integrally with the fuselage 18 and/or may be formed of a single, continuous section.

Although not depicted, in other embodiments, the aircraft 10 may additionally include one or more stabilizers, such as one or more vertical stabilizers, horizontal stabilizers, etc. Moreover, it will be appreciated, that although not depicted, in certain embodiments, one or more of the forward wing assembly 26 or aft wing assembly 28 may additionally include flaps, such as leading-edge flaps or trailing edge flaps, for assisting with controlling the aircraft 10 during flight. Further, in still other exemplary embodiments, the aircraft 10 may not include one or both of the forward wing assembly 26 or aft wing assembly 28.

Referring still to FIGS. 1 and 2, the exemplary aircraft 10 further includes a propulsion system 38 for providing the aircraft 10 with a desired amount of thrust during operation. Broadly speaking, the exemplary propulsion system 38 includes a propulsor and an electric motor, the electric motor configured for rotating the propulsor. More specifically, as will be explained in greater detail below, the exemplary propulsion system 38 of FIGS. 1 and 2 includes a plurality of propulsor assemblies, each including a propulsor and a respective electric motor.

Additionally, the exemplary aircraft 10 includes an electric power source 40, and more specifically, the electric power source 40 includes a combustion engine 94 and an electric generator 96 (see FIG. 2) powered by the combustion engine 94. The exemplary electric power source 40 depicted is located remotely from the propulsion system 38, and within the fuselage 18 of the aircraft 10 proximate the aft end 22 of the fuselage 18. Notably, however, in other embodiments the electric power source 40 may instead be located at any other suitable location within the fuselage 18 of the aircraft 10, or elsewhere.

The aircraft 10 further includes an electric power bus 42 for selectively electrically connecting the electric power source 40 to the propulsion system 38. The electric power bus 42 is operable with a controller 45 (FIG. 2) for distributing electrical power to the various propulsor assemblies through the electric power bus 42. Notably, for the embodiment depicted, the exemplary aircraft 10 additionally includes one or more energy storage devices 44 (such as one or more batteries). The one or more energy storage devices 44 are electrically connected to the electric power bus 40.

More specifically, still, for the embodiment depicted, the propulsion system 38 includes a port forward propulsor assembly and a starboard forward propulsor assembly attached to the forward wing assembly 26 on opposing sides of the fuselage 18, as well as a port aft propulsor assembly and a starboard aft propulsor assembly similarly attached to the aft wing assembly 28 on opposing sides of the fuselage 18. As will be discussed in greater detail below, each of these propulsor assemblies are configured as relatively high diameter electric fan assemblies (i.e., an electric fan driven by an electric motor). Accordingly, the port forward propulsor assembly is a port forward fan assembly 48, the starboard forward propulsor assembly is a starboard forward fan assembly 50, the port aft propulsor assembly is a port aft fan assembly 52, and the starboard aft propulsor assembly is a starboard aft fan assembly 54. Each of the port forward fan assembly 48, starboard forward fan assembly 50, port aft fan assembly 52, and starboard aft fan assembly 54 are selectively in electrical communication with the electric power source 40, via the electric power bus 42, such that each of the propulsor assemblies may be powered by the electric power source 40.

It should be appreciated, that although the variety of propulsors are described herein as "fans", the term is not intended to limit the present disclosure to any single type of electric propulsor. Unless specifically limited by the claims, in other embodiments of the present disclosure, any propulsors described as a "fan" herein may additionally, or alternatively, be configured as any other suitable propulsion device, including, without limitation, ducted fans, un-ducted fans, single stage fans (i.e., fans having a single stage of propellers), and multiple counter-rotating stage fans (i.e., fans having a plurality of stages of counter-rotating propellers).

Referring still to FIGS. 1 and 2, the exemplary aircraft 10 depicted is adapted for accomplishing a substantially vertical takeoff and/or landing, in addition to forward flight. For example, FIG. 1 depicts the aircraft 10 in a vertical (or landing) takeoff mode and FIG. 2 depicts the aircraft 10 and a forward or lateral flight mode.

As will be appreciated, the exemplary aircraft 10 depicted is movable between the vertical takeoff mode and horizontal flight mode at least in part due to each wing assembly including a tilt section. For example, for the exemplary aircraft 10 depicted in FIGS. 1 and 2, the port side 30 of the forward wing assembly 26 includes a tilt section 56, the starboard side 32 of the forward wing assembly 26 includes a tilt section 58, the port side 34 of the aft wing assembly 28 includes a tilt section 60, and the starboard side 36 of the aft wing assembly 28 includes a tilt section 62. The tilt sections 56, 58, 60, 62 of the respective wing assemblies 26, 28 may be attached to respective static wing sections (not labeled) of the respective wing assemblies 26, 28 in any suitable manner. For example, the tilt sections 56, 58, 60, 62 may be attached to respective static wing sections using a swivel connection, a slip ring interface, or in any other suitable manner. Additionally, for the embodiment depicted, each of the fan assemblies 48, 50, 52, 54 are attached to a respective the tilt section 56, 58, 60, 62 of the respective wing assemblies 26, 28. Specifically, for the embodiment depicted, the port forward fan assembly 48 is attached to the tilt section 56 of the port side 30 of the forward wing assembly 26, the starboard forward fan assembly 50 is attached to the tilt section 58 of the starboard side 32 of the forward wing assembly 26, the port aft fan assembly 52 is attached to the tilt section 60 of the port side 34 of the aft wing assembly 28, and the starboard aft fan assembly 54 is attached to the tilt section 52 of the starboard side 36 of the aft wing assembly 28.

Figure 3:
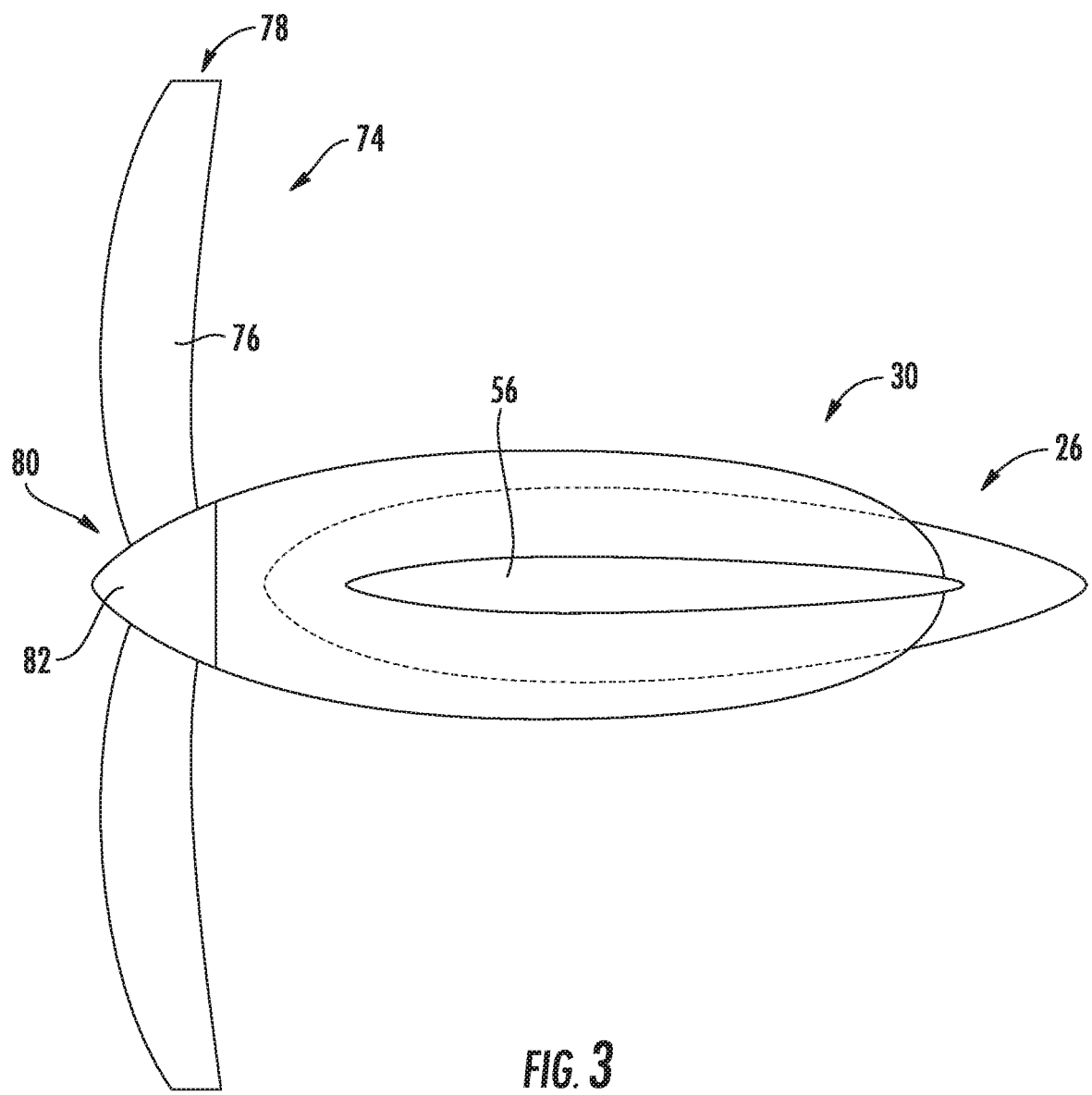
FIG. 3 is a side, schematic view of a side of a wing assembly of the exemplary aircraft of FIG. 1 in a forward thrust position.
Figure 4:
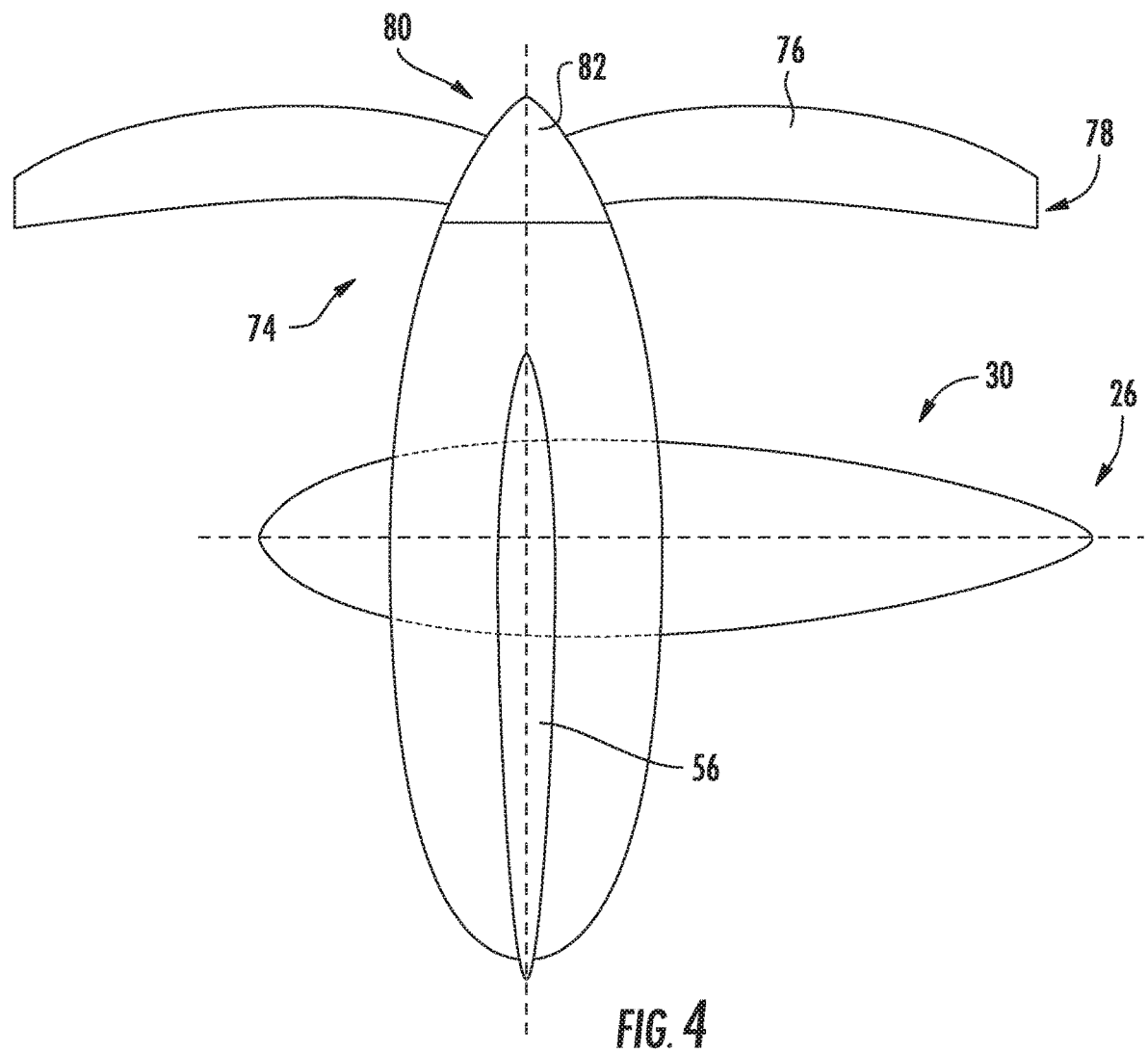
FIG. 4 is another side, schematic view of the side of the wing assembly depicted in FIG. 3 in a vertical thrust position.

Moreover, referring briefly also to FIGS. 3 and 4, side, schematic views of a side of a wing assembly of an aircraft 10 is provided in two operating modes. For example, in certain embodiments, the wing depicted may be a port side 30 of the forward wing assembly 26, described above with reference to FIGS. 1 and 2. As is depicted, each of these tilt sections 56, 58, 60, 62 is movable between a horizontal/forward flight position (FIGS. 2 and 3) and a vertical flight position (FIGS. 1 and 4). Movement of the tilt sections 56, 58, 60, 62 between the horizontal flight position and the vertical flight position additionally moves the respective fan assemblies 48, 50, 52, 54 between a forward thrust position and a vertical thrust position. Accordingly, each of the port and starboard forward fan assemblies 48, 50 and port and starboard aft fan assemblies 52, 54 are movable between a forward thrust position and a vertical thrust position by the respective tilt sections 56, 58, 60, 62. Specifically, each of the tilt sections 56, 58, 60, 62 rotates at least about ninety degrees (90°) between the horizontal flight position in the vertical flight position to rotate the respective fan assemblies 48, 50, 52, 54 between the respective forward thrust positions and vertical thrust positions. It should be appreciated, however, that in other exemplary embodiments, the plurality of fan assemblies 48, 50, 52, 54 may alternatively be moveable between the forward thrust positions and the vertical thrust positions in any other suitable manner. For example, in other embodiments, one or more of the fans 48, 50, 52, 54 may include a hinge assembly for tilting the fan assemblies at least about ninety degrees between the forward thrust position and the vertical thrust position.

Figure 5:
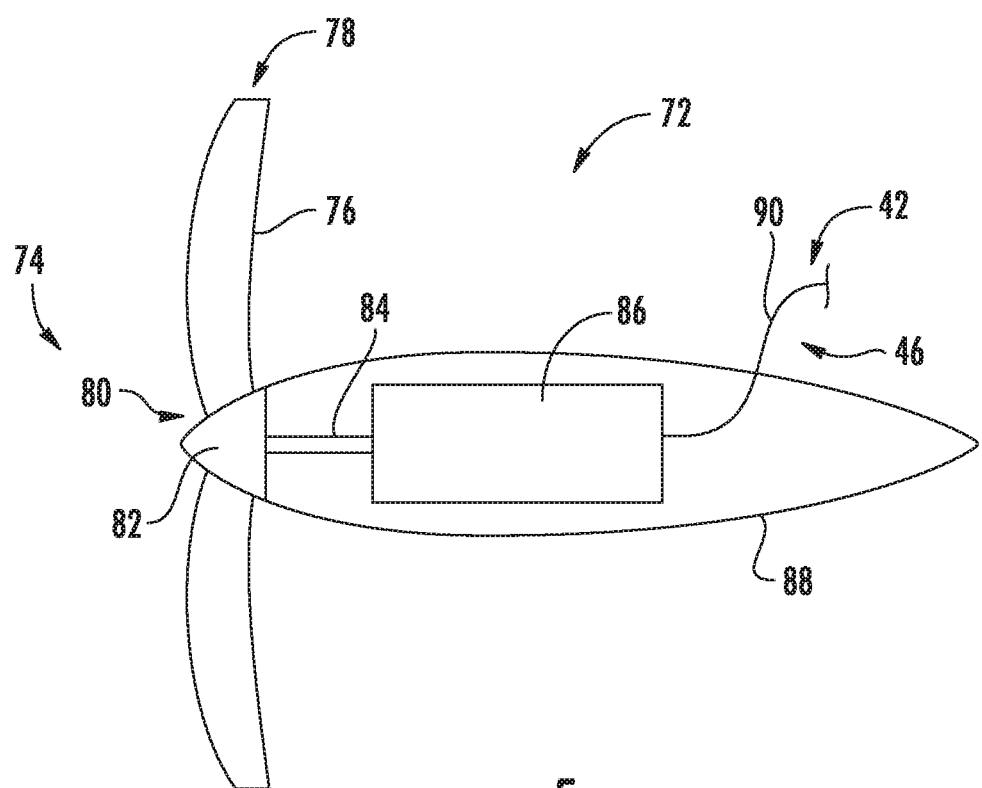
FIG. 5 is a side, schematic view of a primary thrust propulsor in accordance with an exemplary embodiment of the present disclosure.

Referring now also to FIG. 5, a side, schematic view of a fan assembly, including a propulsor/fan and an electric motor, in accordance with an exemplary embodiment of the present disclosure is provided. For the embodiment FIG. 5, the fan assembly is configured as an electric fan assembly, and the exemplary fan and electric motor depicted in FIG. 5 may be representative of the plurality of fan assemblies 48, 50, 52, 54 depicted above.

As is depicted, the exemplary fan assembly is configured as an unducted electric fan 72. The unducted electric fan 72 generally includes a fan section 74 including a plurality of fan blades 76, with each of the plurality of fan blades 76 extending from a radially outer tip 78 to a base 80. Each of the fan blades 76 is attached to a hub 82 of the unducted electric fan 72 at the base 80. The hub 82 is attached through a fan shaft 84 to an electric motor 86 positioned within a cowling 88 of the unducted electric fan 72. The electric motor 86 is in electrical communication with the electric power source 40 via the electric power bus 42, or more particularly, for the embodiment depicted, through an electric line 90 of the electric power bus 42.

Although not depicted, the electric fan 94 may additionally include a gearbox between the electric motor 86 and fan section 74 for increasing or decreasing a rotational speed of the fan 94 relative to the electric motor 86. Moreover, in certain embodiments, the ducted electric fan 94 may include one or more mechanisms for varying a pitch of each of the plurality of fan blades 76 during operation.

Additionally, as briefly stated above, it should be appreciated that in other exemplary embodiments, the fan assemblies may instead be configured in any other suitable manner. For example, in other embodiments, one or more of the fan assemblies may be a ducted fan assembly, may include a multistage fan, etc. Additionally, in other exemplary embodiments, the propulsion system 38 may be any other suitable propulsion system. For example, in other exemplary embodiments, the propulsion system may include any other suitable number of propulsion assemblies, size of propulsion assemblies, position of propulsion assemblies, and/or type of propulsion assemblies. Additionally, or alternatively, any other suitable aircraft capable of performing a vertical takeoff and landing may be provided. For example, in other exemplary embodiments, the aircraft 10 may be configured as a helicopter. Furthermore, in still other exemplary embodiments, the aircraft may not be configured in a manner capable of performing a vertical takeoff and landing, and instead may be configured, e.g., as a traditional, fixed wing aircraft.

Referring back the exemplary embodiment depicted in to FIGS. 1 and 2, and more specifically to FIG. 2, as noted above, the electric power source 40 is selectively electrically connected to the propulsion system 38 to selectively power the propulsion system 38. Particularly, it should be appreciated that the exemplary aircraft 10 depicted in FIGS. 1 and 2 is configured as a mobile, remote power generation aircraft 10. Accordingly, the exemplary aircraft 10 is also configured to generate electrical power and to provide such electrical power to an outside power sink. The outside power sink may be anything outside the aircraft 10 requiring electrical power, such as, equipment, electrical power storage devices, buildings, an electrical grid (see, e.g., FIG. 7), etc. Accordingly, the exemplary aircraft 10 of FIGS. 1 and 2 additionally includes an electrical outlet 92 configured for connection with the outside power sink.

The electrical outlet 92 and the propulsion system 38 are selectively in electrical communication with the electric generator 96 of the electric power source 40 such that the electric generator 96 of the electric power source 40 selectively provides electrical power to one of the electrical outlet 92 or the propulsion system 38. As noted, the electric generator 96 of electric power source 40 is driven by the combustion engine 94 of the electric power source 40.

More specifically, as previously discussed the aircraft 10 includes the electric power bus 42. The electric generator 96 of the electric power source 40 is selectively in electrical communication with the propulsion system 38 and the electrical outlet 92 through the electric power bus 42. More specifically still, the electric power bus 42 includes a switch 98 configured for selectively electrically connecting the propulsion system 38 and the electrical outlet 92 to the electric generator 96 of the electric power source 40. The switch 98 may be any suitable electrical switch capable of selectively electrically connecting the electric generator 96 with at least one of the propulsion system 38 or electrical outlet 92. For example, the switch 98 may be a manually operated switch, or alternatively, may be an electrically operated switch operably connected to a controller or computer of the aircraft 10.

Although not depicted, the aircraft 10 may further include one or more inverters or other electronic systems to condition the electrical power provided from the electrical power source 40 through the electrical outlet 92 to a particular format (e.g., a certain voltage level, a certain amount of current, a type of power such as alternating current or direct-current, etc.). This equipment may be upstream of the electrical outlet 92 and downstream of the switch 98.

Figure 6:
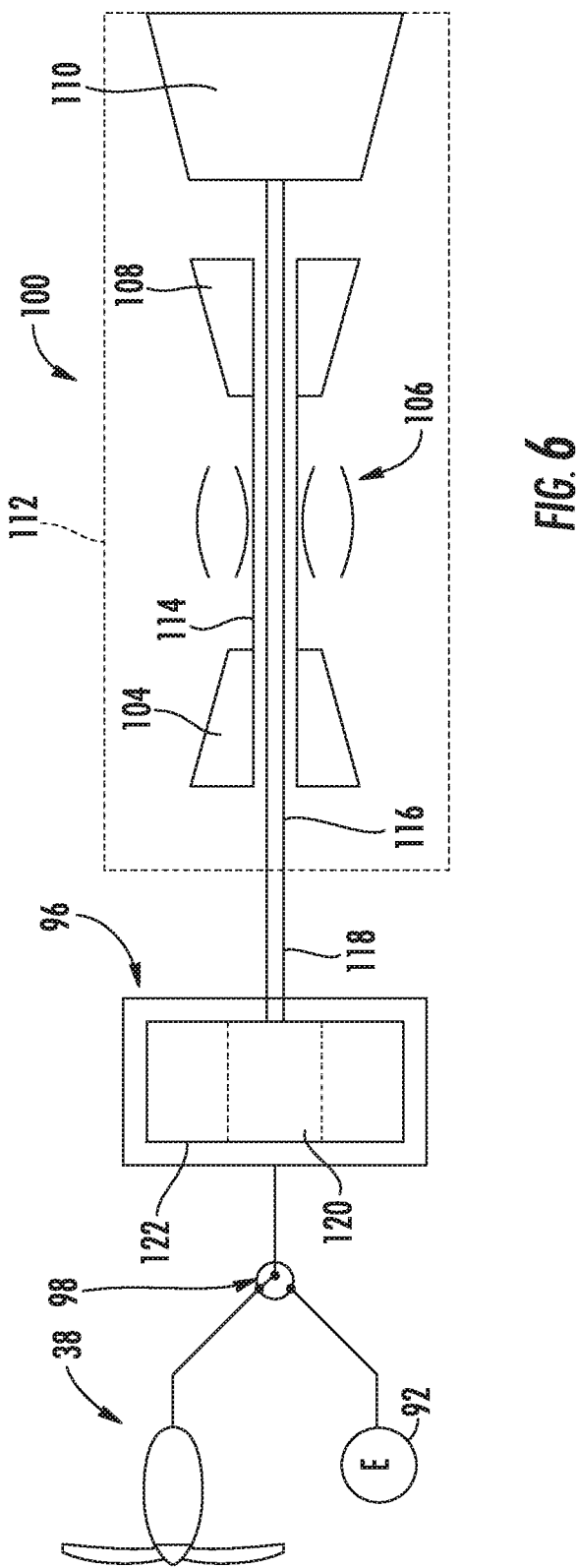
FIG. 6 is a schematic view of an electric system of an aircraft in accordance with an exemplary embodiment of the present disclosure in a flight mode.
Figure 7:
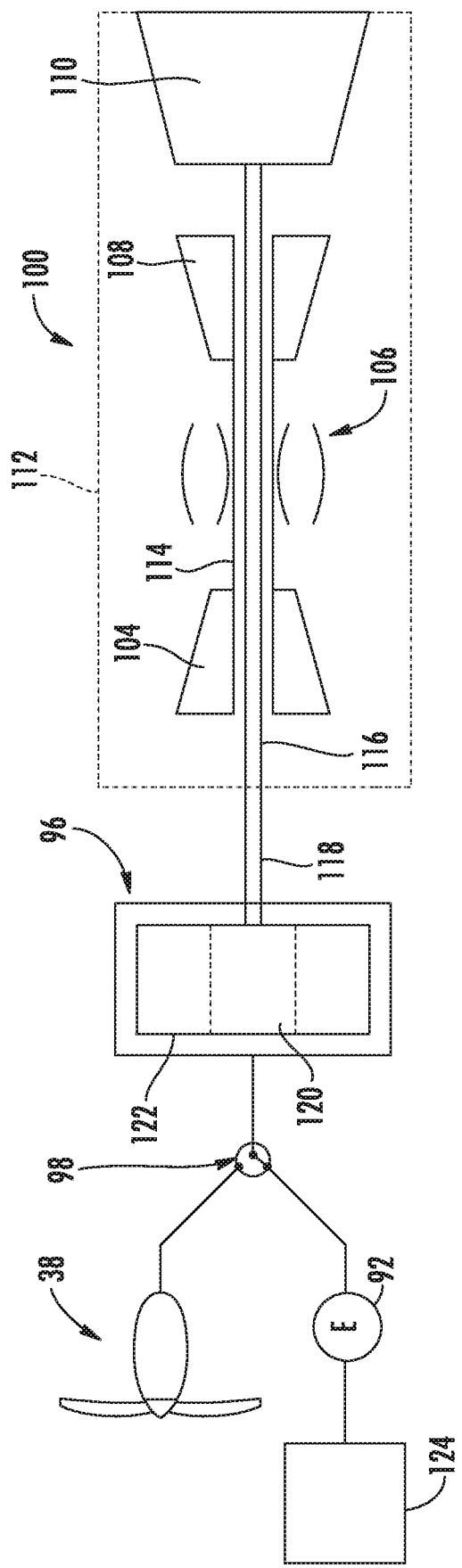
FIG. 7 is a schematic view of the exemplary electric system of the aircraft of FIG. 6 and a power generation mode.

Referring now to FIGS. 6 and 7, an electrical system of an aircraft 10 in accordance with exemplary embodiments of the present disclosure is provided. More specifically, FIG. 6 depicts the electrical system of the aircraft 10 in a flight mode, and FIG. 7 depicts the electrical system of the aircraft 10 in a power generation mode. In certain exemplary embodiments, the exemplary aircraft 10 depicted in FIGS. 6 and 7 may be configured in substantially the same manner as exemplary aircraft 10 described above with reference to FIGS. 1 through 4.

The electric system of the exemplary aircraft 10 depicted generally includes an electric power source 40 and a propulsion system 38. The electric power source 40 generally includes a combustion engine 94 and an electric generator 96. Notably, for the embodiment depicted in FIGS. 6 and 7, the combustion engine 94 is configured as a turboshaft engine 100. The turboshaft engine 100 includes in serial flow order, a compressor section including a high pressure compressor 104, a combustion section 106, and a turbine section including a high pressure turbine 108 and a low pressure turbine 110. During operation, a flow of air is received within the compressor section and is progressively compressed as it flows therethrough, i.e., as it flows through the high pressure compressor 104. The compressed air is then provided to the combustion section 106 where it is mixed with fuel and burned to generate hot combustion gas. The hot combustion gas is expanded through the turbine section where rotational energy is extracted therefrom. Specifically, the hot combustion gas rotates the high pressure turbine 108 and the low pressure turbine 110 as the gas flows therethrough and is expanded. As is depicted in phantom, these components may be enclosed within a casing 112 within, e.g., the fuselage 18 of the aircraft 10. Although not depicted, the hot combustion gas may be exhausted, e.g., to atmosphere, from the low pressure turbine 110.

As is also depicted, for the embodiment of FIGS. 6 and 7, the high pressure turbine 108 is connected to the high pressure compressor 104 through a high pressure shaft or spool 114, such that a rotation of the high pressure turbine 108 additionally rotates the high pressure compressor 104. Additionally, the low pressure turbine 110 is connected a low pressure shaft or spool 116, such that rotation of the low pressure turbine 110 additionally rotates the low pressure shaft or spool 116.

Moreover, for the embodiment depicted, the low pressure shaft 116 additionally drives an output shaft 118 extending to the electric generator 96. Accordingly, a rotation of the turboshaft engine 100 provides rotational energy to the electric generator 96, the electric generator 96 configured to convert the rotational energy to generate electrical power. As will be appreciated, in certain embodiments, the electric generator 96 may generally include a rotor 120 and a stator 122. The rotational energy of the turboshaft engine 100 is provided via the output shaft 118 and configured to rotate the rotor 120 of the electric generator 96 relative to the stator 122. Such relative movement may generate electrical power.

It should be appreciated, however, that the exemplary turboshaft engine 100 depicted is provided by way of example only, and that in other exemplary embodiments, the turboshaft engine 100 may have any other suitable configuration. For example, in other embodiments, the turboshaft engine 100 may include any other suitable number of compressors or turbines, as well as any other suitable number or configuration of shafts or spools. Similarly, in other exemplary embodiments, the electric generator 96 may have any other suitable configuration. For example, although the exemplary electric generator 96 in FIGS. 6 and 7 is depicted in an "in-runner" configuration with the rotor 120 located radially inward of the stator 122, in other exemplary embodiments, the electric generator may instead be configured in an "out-runner" configuration with the rotor 120 located radially outward of the stator 122. Moreover, in other exemplary embodiments, the electric power source 40 may be configured in any other suitable manner, e.g., to include two or more combustion engines, such as two or more turboshaft engines, and two or more electric generators. For example, in other exemplary embodiments, the electric power source 40 may include two or more combustion engines and respective electric generators in series or in parallel.

Inclusion of an electric power source 40 having a turboshaft engine 100 and electric generator 96 in accordance with an exemplary embodiment of the present disclosure may allow for the electric power source 40 to generate a relatively high amount of electric power and to provide such electric power to either the propulsion system 38 or the electrical outlet 92. For example, in at least certain exemplary embodiments, the turboshaft engine 100 and electric generator 96 may be sized such that the electric power source 40 generates at least about 0.75 megawatts ("MW") of electrical power during operation. For example, in certain exemplary embodiments, the electric power source 40 is configured to generate at least about 1 MW, such as at least about 2 MW, such as at least about 5 MW.

Moreover, referring specifically to FIG. 6, during the flight mode of the aircraft 10, the electric power source 40 is operable to provide electric power to the propulsion system 38. More specifically, during the flight mode, the electric generator 96, powered by the turboshaft engine 100, is configured to provide electrical power to and through the electric power bus 42, including the switch 98, to the propulsion system 38.

By contrast, referring specifically to FIG. 7, during the power generation mode of the aircraft 10, the electric power source 40 is operable to provide electric power to the electrical outlet 92 of the aircraft 10. More specifically, during the power generation mode, the electric generator 96, again powered by the turboshaft engine 100, is configured to provide electrical power to and through the electric power bus 42, including the switch 98, to the electrical outlet 92. For example, as is depicted, the electrical outlet 92 is configured for connection with an outside power sink, such that the electrical power provided to the electrical outlet 92 may be provided to the outside power sink. For the exemplary embodiment depicted, the outside power sink is an electrical grid 124. For example, the electrical grid 124 may be an electrical grid of a remote area to which the aircraft 10 flew during operation of the aircraft 10 in the flight mode.

Such a configuration may allow for the aircraft 10 to provide substantially all of its electrical power to an outside power sink during the power generation mode. For example, in the embodiment depicted, the electric power source 40 is configured to generate a maximum output power, and the aircraft 10 is configured to provide substantially the maximum output power to and through the electrical outlet 92 to the outside power sink when the electric power source 40 is in electrical communication with the electrical outlet 92 (i.e., in the power generation mode).

Further, in certain exemplary embodiments, the electric power source 40 may be oversized for the aircraft 10 in order to allow the aircraft 10 provide a relatively large amount of electrical power to a remote area. More specifically, in certain exemplary embodiments, the propulsion system 38 may utilize a maximum flight power during flight operations of the aircraft 10 (see, e.g., FIG. 6). With such an exemplary embodiment, the maximum output power of the electric power source 40 is capable of providing may be greater than the maximum flight power. For example, in certain exemplary embodiments, the maximum output power may be at least about ten percent (10%) greater than the maximum flight power. Notably, however, the aircraft 10 may be configured to provide substantially the maximum output power to the output side power sink through the electrical outlet 92 when the electric generator 96 is in electrical communication with the electrical outlet 92 (i.e., in the power generation mode; see, e.g., FIG. 7). However, in other embodiments, the maximum flight power may be substantially equal to the maximum output power.

Figure 8:
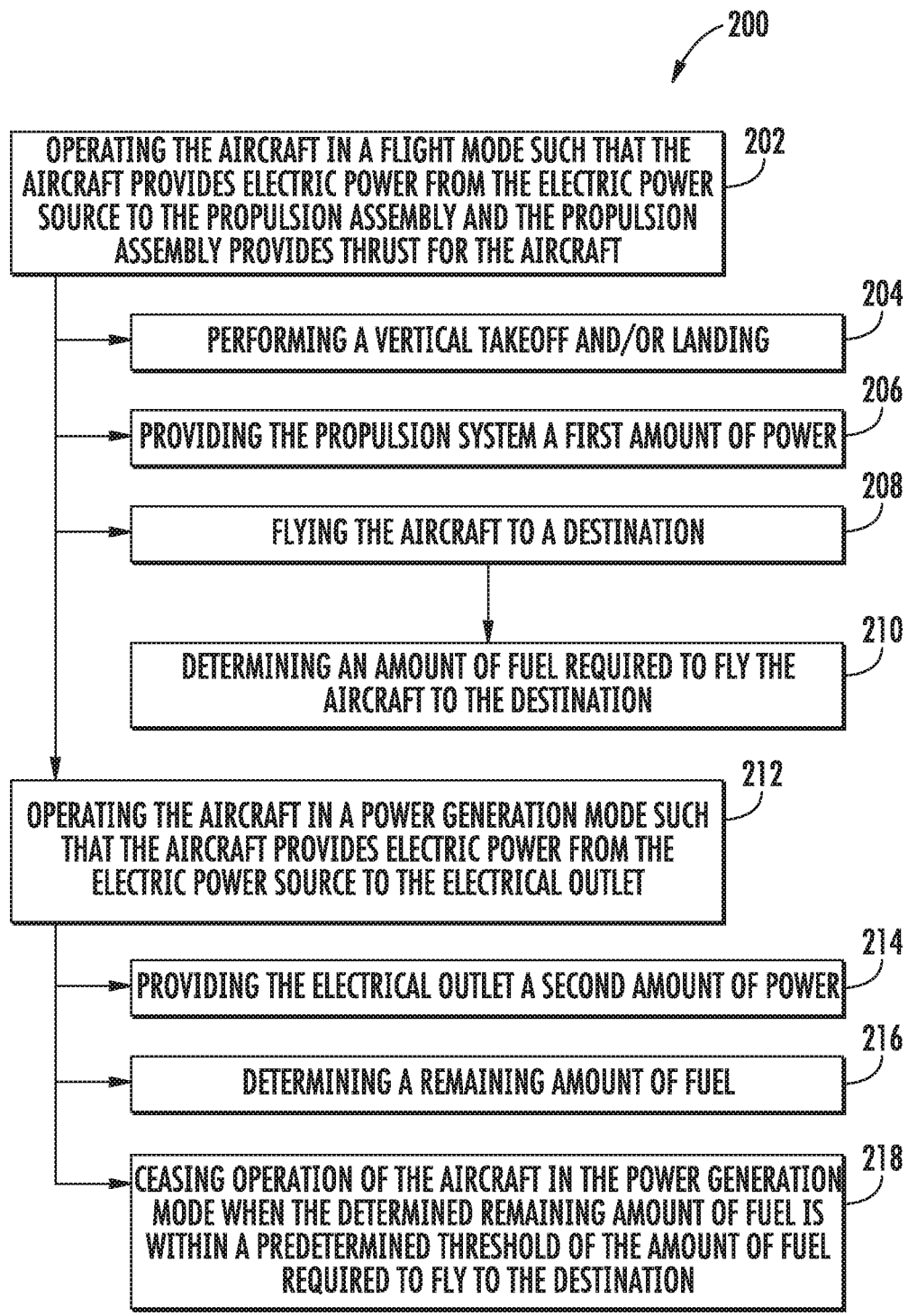
FIG. 8 is a flow diagram of a method for operating an aircraft in accordance with an exemplary aspect of the present disclosure.

Referring now to FIG. 8, a flow diagram of a method 200 for operating an aircraft in accordance with an exemplary aspect of the present disclosure is provided. The exemplary method 200 of FIG. 8 may in certain exemplary aspects be utilized to operate an aircraft configured in a manner similar to the exemplary aircraft described above. Accordingly, the exemplary aircraft may include an electric power source having a combustion engine and an electric generator powered by the combustion engine, a propulsion system, and an electrical outlet.

As is depicted, the exemplary method 200 includes at (202) operating the aircraft in a flight mode such that the aircraft provides electric power from the electric power source to the propulsion assembly and the propulsion assembly provides thrust for the aircraft. More specifically, for the exemplary aspect depicted, operating the aircraft in the flight mode at (202) includes at (204) performing a vertical takeoff and/or landing. Additionally, for the exemplary aspect depicted, operating the aircraft in the flight mode at (202) further includes at (206) providing the propulsion system a first amount of power. The first amount of power may be a maximum flight power, i.e., a maximum or peak amount of power required by the propulsion system of the aircraft, such as an amount of power required during takeoff of the aircraft.

Additionally, operating the aircraft in the flight mode at (202) includes at (208) flying the aircraft to a destination and at (210) determining an amount of fuel required to fly the aircraft to the destination. For example, the destination may be a remote location previously subjected to a disaster disabling traditional electric power generation sources, or otherwise requiring electric power sources.

As is also depicted, the exemplary method 200 further includes at (212) operating the aircraft in a power generation mode such that the aircraft provides electric power from the electric power source to the electrical outlet. Operating the aircraft in the power generation mode at (212) may take place subsequent to, or prior to, operating the aircraft in the flight mode at (202). Additionally, the aircraft is grounded during operation of the aircraft in the power generation mode at (212).

As is depicted, operating the aircraft in the power generation mode at (212) includes at (214) providing the electrical outlet a second amount of power, or more specifically, providing an electric power sink the second amount of power through the electrical outlet. In certain exemplary embodiments, the second amount of power may be substantially equal to the first amount of power. Further, in certain exemplary embodiments, the first and second amounts of power may each be at least about 1 MW.

However, in other exemplary embodiments the second amount of power provided at (214) may be greater than the first amount of power provided at (206). For example, in certain exemplary embodiments, the second amount of power may be at least about 10% greater than the first amount of power.

Moreover, for the exemplary aspect of FIG. 8, the method 200 include safeguards to ensure the aircraft maintains sufficient fuel for a return flight when, e.g., the aircraft is flying to a remote location to provide such remote location electric power. Accordingly, operating the aircraft in the power generation mode at (212) further includes at (216) determining a remaining amount of fuel, and at (218) ceasing operation of the aircraft in the power generation mode when the determined remaining amount of fuel is within a predetermined threshold of the amount of fuel required to fly to the destination determined at (210).

Operation of an aircraft in accordance with the exemplary method 200 may allow for the aircraft to fly to a relatively remote location in need of electrical power and provide such remote location the desired electric power. Such an aircraft may be able to provide such remote location electric power when other, more traditional means are impractical or less practical. For example, such an aircraft may be capable of delivering fuel and a generator as a single package, potentially with little or no manpower required.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft comprising:
   an electric power source comprising a combustion engine and an electric generator, the electric generator powered by the combustion engine;
   a propulsion assembly including a propulsor and an electric motor, the electric motor configured for rotating the propulsor; and
   an electrical outlet receiving an unconverted output power from the electric generator and configured for connection with an outside power sink, the electrical outlet and the propulsion assembly selectively in electrical communication with the electric power source such that the electric power source selectively provides electrical power to one of the electrical outlet or the propulsion assembly;
   wherein the propulsion assembly utilizes a maximum flight power during flight operations of the aircraft, wherein the electric generator is configured to generate a maximum output power, and wherein the maximum output power is greater than the maximum flight power.

2. The aircraft of claim 1, wherein the electric power source is configured to generate a maximum output power, and wherein the aircraft is configured to provide substantially the maximum output power to the electrical outlet when the electric generator is in electrical communication with the electrical outlet.

3. The aircraft of claim 1, wherein the combustion engine is a turboshaft engine.

4. The aircraft of claim 1, wherein the electric power source is configured to generate at least about 1 megawatt.

5. The aircraft of claim 1, further comprising:
   an electric power bus, wherein the electric power source is selectively in electrical communication with the propulsion assembly and the electrical outlet through the electric power bus.

6. The aircraft of claim 5, wherein the electric power bus comprises a switch for selectively electrically connecting the propulsion assembly and the electrical outlet to the electric power source.

7. The aircraft of claim 1, wherein the aircraft is an unmanned aerial vehicle.

8. The aircraft of claim 1, wherein the aircraft is configured for vertical takeoff and landing.

9. The aircraft of claim 1, wherein the propulsion assembly further comprises a plurality of propulsors and a respective plurality of electric motors.

10. The aircraft of claim 1, wherein the maximum output power is at least about ten percent greater than the maximum flight power.

11. The aircraft of claim 1, wherein the aircraft is configured to provide substantially the maximum output power to the outside power sink through the electrical outlet when the electric power source is in electrical communication with the electrical outlet.

12. The aircraft of claim 1, wherein the maximum flight power is a peak amount of power required by the propulsion system, and wherein the electric generator is sized to generate the maximum output power.

13. A method for operating an aircraft including an electric power source having a combustion engine and an electric generator powered by the combustion engine, a propulsion assembly, and an electrical outlet, the method comprising:
operating the aircraft in a flight mode such that the aircraft provides electric power from the electric power source to the propulsion assembly and the propulsion assembly provides thrust for the aircraft; and
operating the aircraft in a power generation mode such that the aircraft provides electric power from the electric power source to the electrical outlet;
wherein the propulsion assembly utilizes a maximum flight power during flight operations of the aircraft, wherein the electric generator is configured to generate a maximum output power of at least about 1 megawatt, and wherein the maximum output power is greater than the maximum flight power.

14. The method of claim 13, wherein operating the aircraft and the flight operating mode includes providing the propulsion assembly a first amount of power, wherein operating the aircraft in the power generation mode comprises providing the electrical outlet a second amount of power, and wherein the first and second amounts of power are each at least about one megawatt.

15. The method of claim 13, wherein the aircraft is grounded during the power generation operating mode.

16. The method of claim 13, wherein operating the aircraft in the flight mode includes performing a vertical takeoff and/or landing.

17. The method of claim 13, wherein operating the aircraft in the flight mode comprises flying the aircraft to a destination and determining an amount of fuel required to fly the aircraft to the destination, and wherein operating the aircraft in the power generation mode comprises ceasing operating the aircraft in the power generation mode when a remaining amount of fuel is within a predetermined threshold of the determined amount of fuel required to fly to the destination.

18. The method of claim 13, wherein operating the aircraft and the flight operating mode includes providing the propulsion assembly a first amount of power, wherein operating the aircraft in the power generation mode comprises providing the electrical outlet a second amount of power, and wherein the second amount of power is greater than the first amount of power.

19. The method of claim 18, wherein the second amount of power is at least about ten percent greater than the first amount of power.

20. An aircraft comprising:
an electric power source comprising a combustion engine and an electric generator, the electric generator powered by the combustion engine;
a propulsion assembly including a propulsor and an electric motor, the electric motor configured for rotating the propulsor; and
an electrical outlet configured for connection with an outside power sink, wherein the electrical outlet receives power directly from the electric generator.

* * * * *